June 1, 1926.
I. B. TANNER
1,587,129
LIQUID TREATING APPARATUS
Filed July 23, 1924    2 Sheets-Sheet 1
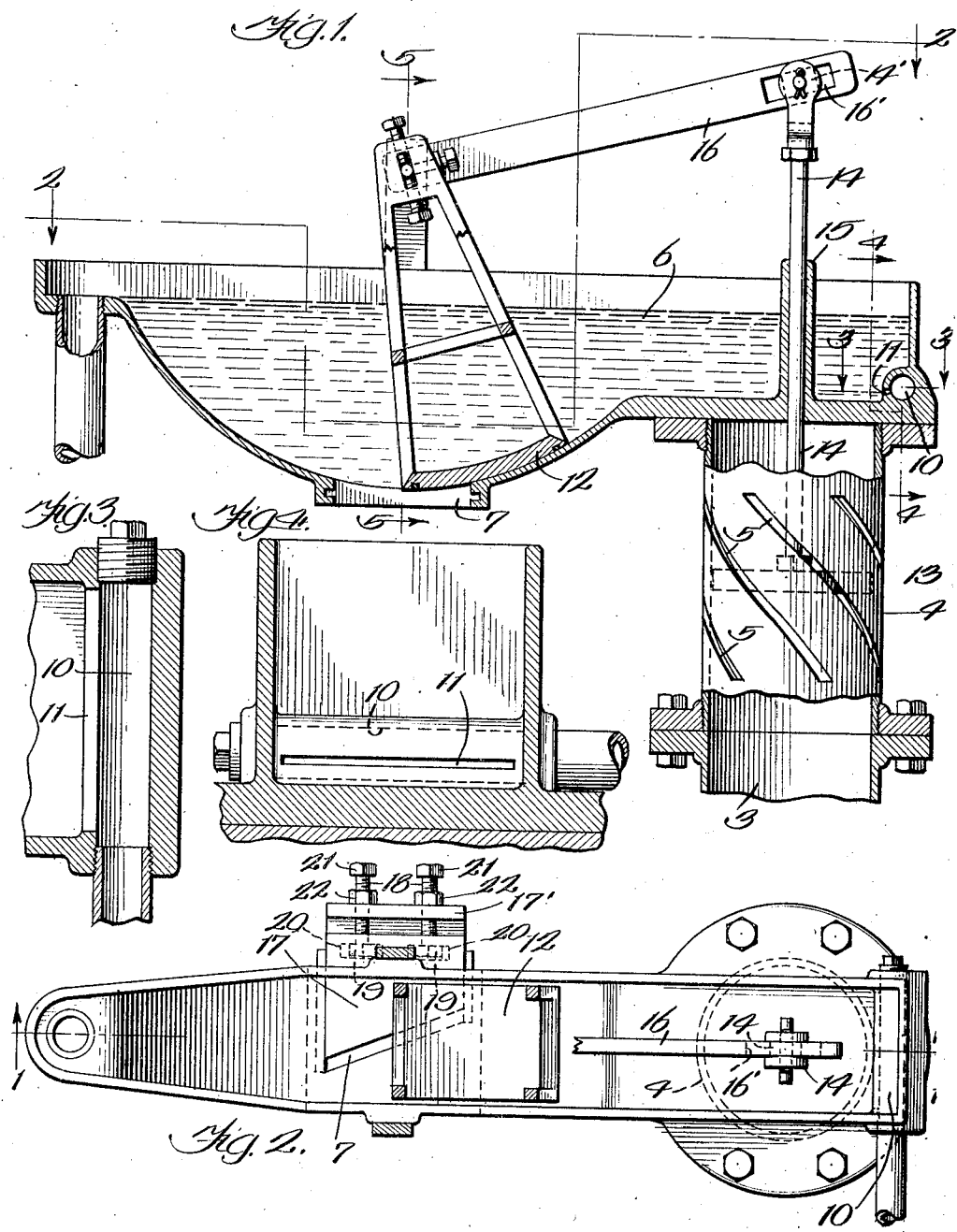
Inventor:
Thos. B. Tanner June 1, 1926.
I. B. TANNER
LIQUID TREATING APPARATUS
Filed July 23, 1924  2 Sheets-Sheet 2
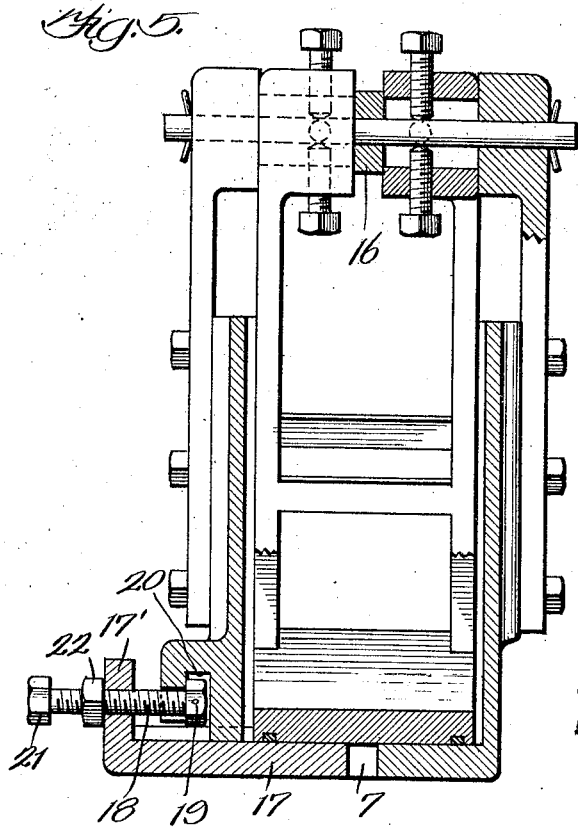
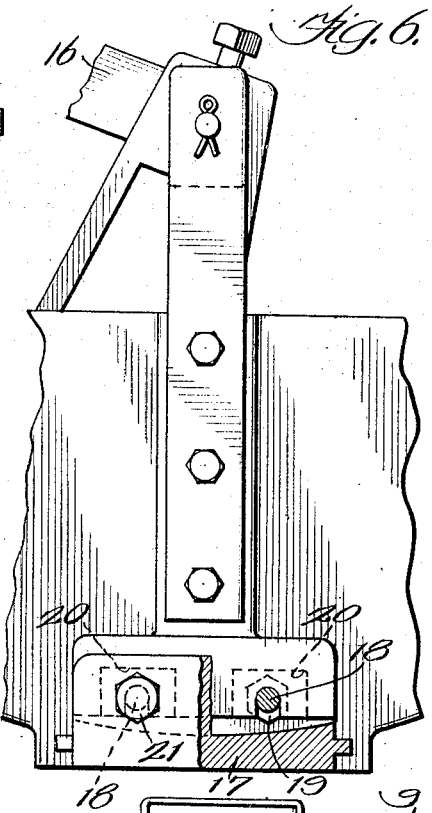
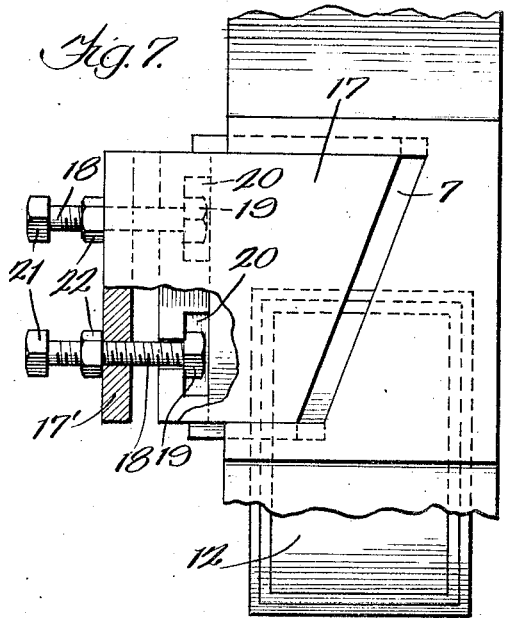
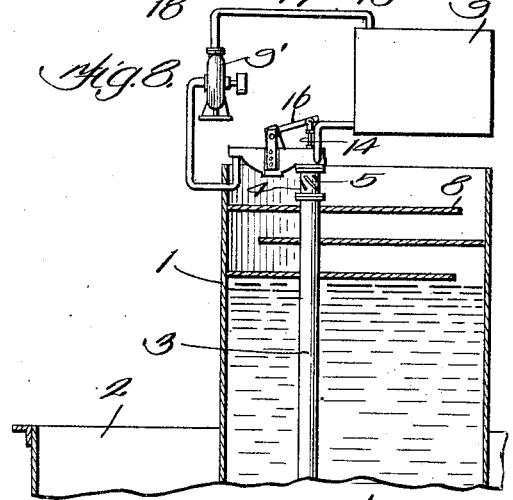
Inventor: Inos B. Tanner Patented June 1, 1926.

1,587,129

UNITED STATES PATENT OFFICE.

INOS B. TANNER, OF CHICAGO, ILLINOIS.

LIQUID-TREATING APPARATUS.

Application filed July 23, 1924. Serial No. 727,814.

My invention relates to liquid treating apparatus and has a number of objects and advantages in view. The invention is of particular utility in the softening of water.

The apparatus of my invention, in one of its aspects, includes a source of raw water or other liquid to be treated, a pipe communicating with said source, a valve in said pipe operated by the liquid, the pipe having a port closed by said valve and also opened to varying extents by the valve according to the pressure exerted upon the valve by the liquid, a settling chamber into which the liquid to be treated is discharged through said port, a chemical tank, a chemical valve in controlling relation to a port formed in the chemical tank which is positioned to discharge chemical into the settling chamber, a stem upon the first valve, a guide for the stem to confine it and the valve to rectilineal movement and a bell crank lever having one end in sliding connection with said stem and carrying the second valve upon its outer end.

The chemical tank is supplied from a main source of chemical through a duct having a narrow and elongated horizontal outlet discharging into the chemical tank.

The ports, through which the chemical and the liquid that is to be treated by the chemical are passed into the settling chamber, are oblique to the lines of movement of the valves which control these ports, whereby the wearing effect of the edges of the ports upon the valves is spread over a wider range than otherwise would be the case, whereby the tendency to form grooves in the valves due to the wearing action thereon at the ports is materially reduced.

The invention will be more fully explained in connection with the accompanying drawing in which Fig. 1 is a sectional elevation of a part of the equipment taken on line 1—1 of Fig. 2, portions being shown in elevation and other portions being broken away; Fig. 2 is a sectional plan view on line 2—2 of Fig. 1; Fig. 3 is a sectional view on line 3—3 of Fig. 1; Fig. 4 is a sectional view on line 4—4 of Fig. 1; Fig. 5 is a sectional view on line 5—5 of Fig. 1; Fig. 6 is a side view of structural portion shown in Fig. 5, parts being broken away; Fig. 7 is a plan view of a part of the structure with portions broken away and Fig. 8 is a somewhat diagrammatic illustration of the application of the various features of my invention to a water softening equipment.

The equipment generally illustrated in Fig. 8 includes a settling chamber 1 discharging liquid into the receiving and supply tank 2, either in a completely or partially chemically treated condition. The raw water or other liquid to be treated is supplied through a riser or pipe 3 which includes a section 4 at its upper end which is formed with ports 5 through which the liquid to be treated is discharged into the settling chamber. The chemical is also discharged into the settling chamber from a receptacle 6 having a discharge port 7 in its bottom. Baffle plates 8 are interposed in the path of the descending liquid and chemical causing a thorough intermixture thereof while descending. The chemical is supplied to the receptacle 6 from a chemical tank or source 9 with the aid of a pump 9'. A chemical conveying duct 10 is formed in one bottom corner of the receptacle 6, this duct having a narrow and elongated horizontal outlet 11 discharging into the chemical receptacle. The chemical is thus admitted to the receptacle in the form of a thin and wide sheet or band which will not materially agitate the chemical and will permit it to be discharged into the settling chamber at a uniform rate determined by the position of the oscillatory valve 12.

In the case of a water softening system, the water to be treated is supplied from the city mains or from any other suitable source and flows through the riser 4 to and through the ports 5, the extent of the flow being determined by the position of the piston valve 13. The water passing through the riser acts upon the valve 13 whose position is determined according to the rate of flow of the water. The valve 13, in turn, controls the position of the oscillatory valve 12 to maintain a fixed ratio between the volumes of chemical and water that are supplied to the settling chamber. The mechanism whereby the valve 13 performs this function includes a stem 14 with which the valve 13 is provided. A guide 15 for the stem confines the stem and valve to rectilineal movement, the guide 15 being preferably in the form of a tube in which the stem has sliding fit. A bell crank has one arm 16 in sliding connection with the outer end of the stem 14, and whose other end carries the oscillatory valve 12. Sliding connection between the valve stem 14 and the bell crank arm 16 is desirably effected through the intermediation of a block 14' journaled upon the upper end of the stem 14 and slidingly received in the rectangular opening 16' in the bell crank arm 16.

The chemical port 7 is adjustable in width by means of the plate 17 which is adjustable transversely of the receptacle 6 by means of the bolts 18 whose heads 19 are received in pockets 20 in one side of the receptacle 6 and whose stems are in threaded connection with an angular extension 17' of the plate 17. The bolts are provided with additional heads 21 whereby they may be turned in either direction and also receive set-nuts 22 whereby the positions to which the bolts are turned are secured.

The chemical port 7 is a slot that is oblique with respect to the line or plane of movement of the oscillatory valve 12 whereby wear upon the valve at the edges of the port is materially reduced. Each of the ports 5, likewise, is a slot that is oblique with respect to the direction of movement of the valve 13, for a similar reason. The ports 5 are preferably parallel and desirably overlap. By evenly distributing the overlapping ports 5 around the pipe 4, the edges of the ports will have such uniform wear upon the valve as not to form any grooves in the valve.

Changes may be made without departing from my invention.

Having thus described my invention, I claim:—

1. The combination with a fluid receptacle having a port in the form of a slot for the passage of fluid therefrom; of a valve for said port, said port being oblique with respect to the line of relative movement of said valve and port.

2. The combination with a fluid receptacle having a plurality of ports, each in the form of a slot; of a valve for said ports, said ports being parallel with respect to each other and oblique with respect to the line of relative movement of the valve and ports.

In witness whereof, I hereunto subscribe my name.

INOS B. TANNER.